(12) United States Patent
Cao et al.

(10) Patent No.: US 11,143,497 B2
(45) Date of Patent: Oct. 12, 2021

(54) DETERMINATION OF A FLEXIBLE DISPLAY

(71) Applicant: INTERNATIONAL BUSINESS MACHINES CORPORATION, Armonk, NY (US)

(72) Inventors: Ying Cao, Beijing (CN); Jun Su, Beijing (CN); Yin Xia, Beijing (CN); Ting Yin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/712,225

(22) Filed: Sep. 22, 2017

(65) Prior Publication Data

US 2019/0094006 A1 Mar. 28, 2019

(51) Int. Cl.
| | | |
|---|---|---|
| *G01B 7/16* | (2006.01) | |
| *G06F 3/041* | (2006.01) | |
| *G06F 3/044* | (2006.01) | |
| *G06F 3/03* | (2006.01) | |
| *G06F 1/16* | (2006.01) | |

(52) U.S. Cl.
CPC .............. *G01B 7/22* (2013.01); *G06F 1/1652* (2013.01); *G06F 3/03* (2013.01); *G06F 3/0418* (2013.01); *G06F 3/0447* (2019.05); *G06F 3/044* (2013.01); *G06F 3/0412* (2013.01); *G06F 3/04186* (2019.05); *G06F 2203/04102* (2013.01)

(58) Field of Classification Search
CPC ......... G06F 3/041; G06F 3/044; G06F 3/0418

USPC ................................................. 345/173–174
See application file for complete search history.

(56) References Cited

U.S. PATENT DOCUMENTS

| | | |
|---|---|---|
| 8,553,008 B2 | 10/2013 | Cho et al. |
| 2006/0238494 A1 | 10/2006 | Narayanaswami et al. |
| 2011/0141052 A1* | 6/2011 | Bernstein ................ G06F 3/016 345/174 |
| 2013/0328764 A1 | 12/2013 | Chon et al. |
| 2014/0015743 A1* | 1/2014 | Seo ........................ G06F 1/1694 345/156 |
| 2014/0098095 A1* | 4/2014 | Lee .......................... G06F 3/041 345/420 |
| 2014/0285433 A1 | 9/2014 | Park et al. |
| 2015/0277617 A1 | 10/2015 | Gwin et al. |
| 2015/0370396 A1* | 12/2015 | Hotelling ............... G06F 3/0414 345/174 |
| 2016/0011689 A1* | 1/2016 | Kim ........................ G06F 3/045 345/173 |
| 2016/0034088 A1* | 2/2016 | Richards ................. G01L 1/205 345/173 |
| 2016/0328017 A1 | 11/2016 | Vertegaal | 
| 2017/0123558 A1 | 5/2017 | Hong et al. |

* cited by examiner

*Primary Examiner* — Kwin Xie
(74) *Attorney, Agent, or Firm* — Robert R. Aragona (57) ABSTRACT

Embodiments of the present disclosure relate to a method, an electronic device and a computer program for determining bending of a flexible display. The flexible display comprises two parallel capacitive layers and an isolator layer between the two parallel capacitive layers, wherein each capacitive layer comprises multiple capacitive electrodes pairs. The method measures capacitance values of the capacitive electrodes pairs. And then the method determines the bending of the flexible display based on the result of measurement.

18 Claims, 4 Drawing Sheets

DETERMINATION OF A FLEXIBLE DISPLAY

BACKGROUND

The present invention generally relates to electronic devices, and more specifically, this invention relates to bending determination of a flexible display.

A flexible display is an electronic visual display which is flexible in nature, as opposed to the more prevalent traditional flat screen displays used in most electronics devices. In recent years, there has been a growing interest from numerous consumer electronics manufacturers to apply flexible display technology in e-readers, mobile phones and other electronic devices. When the flexible display is used on mobile phones or other electronic devices, the flexible display can also be used as an input device to detect human operation to improve user experiences.

SUMMARY

Example embodiments of the present disclosure provide a method, a system, and a computer program product for determining bending of a flexible display.

In an aspect, a computer-implemented method is provided for determining bending of a flexible display of an electronic device. The flexible display comprises two parallel capacitive layers and an isolator layer between the two parallel capacitive layers, wherein the two parallel capacitive layers include a first capacitive layer and a second capacitive layer, both of which comprise multiple capacitive electrodes pairs. The method measures capacitance values of the capacitive electrodes pairs, and determines the bending of the flexible display based on the result of measurement.

In another aspect, an electronic device is provided. The electronic device comprises a flexible display, wherein the flexible display comprises two parallel capacitive layers, including a first capacitive layer and a second capacitive layer, both of which comprise multiple capacitive electrodes pairs. The capacitance values of the capacitive electrodes pairs are measured to determine bending of the flexible display. The flexible display also comprises an isolator layer between the two parallel capacitive layers.

Other embodiments and aspects, including but not limited to computer program product, are described in detail herein and are considered a part of the claimed invention.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
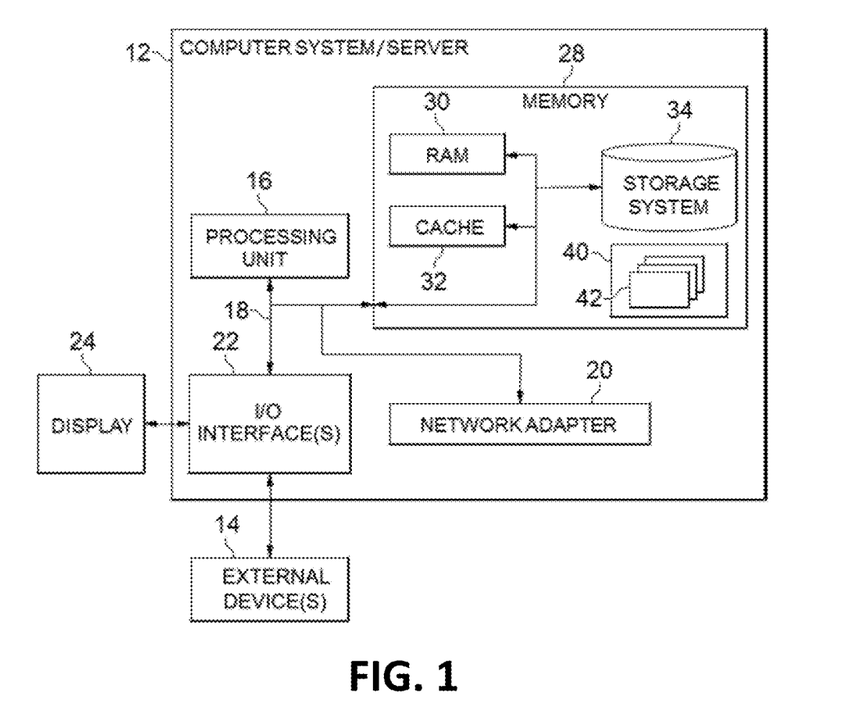
FIG. 1 shows an exemplary computer system which is applicable to implement the embodiments of the present disclosure.

Referring now to FIG. 1, in which an exemplary computer system/server 12 which is applicable to implement the embodiments of the present invention is shown. FIG. 1 is also adapted to depict an illustrative example of a portable device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

With an increasing interest in recent years to apply flexible display in electronics devices, there is a strong need to detect how the flexible display has been bended, so that other function and action can be triggered on the electronic devices. The conventional method to detect bending of flexible display uses additional capacitive flexible sensor board to collect human's input. However, additional capacitive sensor board will thicken the electronic device and cause higher power consumption, and as the capacitive sensor board is applied around the flexible display, bending in every place of the full flexible display may not be detected.

The term "bend", "bending", "bended" used throughout this disclosure should be understood as any type of shape deformation, including but not limited to folding, twist, poke, skew, distortion to whatever extent and applied to either part or whole of the screen.

According to embodiments of this disclosure, a full screen capacitive sensor could be applied by leveraging existing capacitive layer as well as a newly added parallel capacitive layer, which provides an optimized solution to detect bending of a flexible display.

Figure 2:
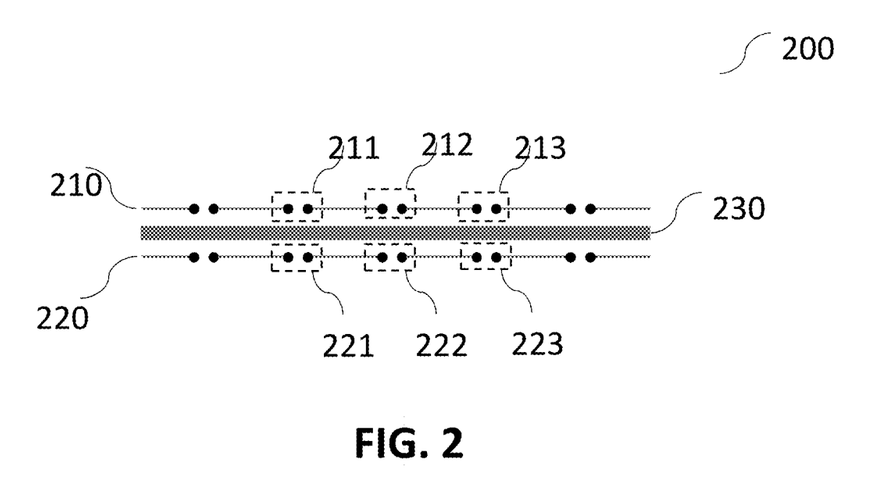
FIG. 2 shows an exemplary profile of a flat flexible display in accordance with embodiments of the present disclosure.

FIG. 2 shows an exemplary profile of a flat flexible display in accordance with embodiments of the present disclosure. The flexible display includes a first capacitive layer 210, an isolator layer 230, and a second capacitive layer 220, all the three layers are deployed in parallel. Actually, many existing electronic device includes one capacitive layer in the display to detect finger touch from a user. Therefore, embodiments of this disclosure add another new capacitive layer in the display to work together with the existing capacitive layer to detect bending of a flexible display. In accordance with other embodiments of this invention, both capacitive layers could be newly adopted layers. On each of the capacitive layer, the same type of capacitive sensors, namely a pair of capacitive electrodes (such as 211, 212, 213, 221, 222 or 223 illustrated in FIG. 2) are applied, so that deformation at each (or one or more) capacitive sensor can be measured using the same standard and compared with each other to determine bending of the flexible display.

The capacitance value between two capacitive electrodes could be sensed by a circuit (not illustrated) and correlated to shape deformation of the capacitive layer at a position of the capacitive electrodes. As known from formula of capacitance computation below, C refers to capacitance value of a pair of capacitive electrodes, refers to a constant, S refers to the area of the pair of capacitive electrodes which could be the same as that of each capacitive electrodes pair, d refers to the distance between the capacitive electrodes in a capacitive electrodes pair, k is the constant of static electricity. Therefore, the capacitance value is inversely proportional to the distance between two capacitive electrodes of the capacitive sensor.

$$C=\varepsilon S/4\pi kd$$

When bending the flexible device, the capacitive layers 210 and 220 embedded in the electronic device would suffer tension. Thus, distances between capacitive electrodes 211, 212, 213, 221, 222 or 223, etc. would be changed in different degree, and this would cause changes in capacitance values of capacitive sensors. The method according to embodiments of this disclosure would detect the changes in capacitance values of each capacitive sensors when the flexible display is bended.

According to embodiments of the disclosure, the isolator layer 230 can be filled between two capacitive layers 210 and 220 so that deformation of the capacitive electrodes in the first layer could be different than that in the same position of the second capacitive layer, and this difference can be leveraged to determine details of the bending of the flexible display. In accordance with embodiments of this disclosure, the isolator layer 230 could be a display layer of the electronic device. And the first or second capacitive layers could be transparent. In accordance with other embodiments, the isolator layer 230 could be other layer of the electronic device, even an air layer, and the isolator layer 230 could include more than one layers in practice, but combination of which could still be called an isolator layer for illustration purpose.

Figure 3:
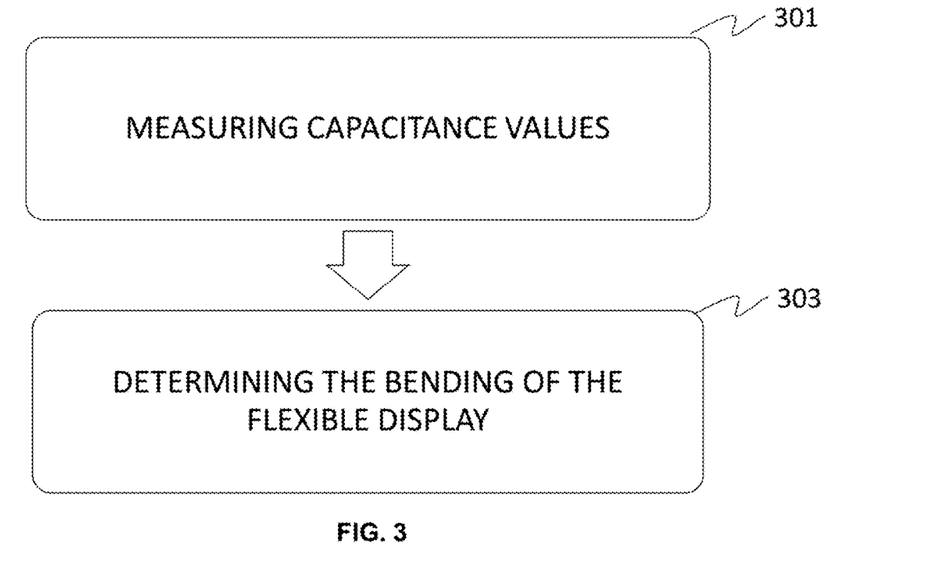
FIG. 3 shows a flowchart of a method for determining a bending of the flexible display in accordance with embodiments of the present disclosure.

FIG. 3 shows a flowchart of a method for determining bending of the flexible display in accordance with embodiments of the present disclosure. The method comprises block 301 and block 303. At block 301, capacitance values of pairs of capacitive electrodes are measured. In some embodiments, the capacitance values are measured when the screen of the electronics device is activated, such as when the electronics device is activated from a dark screen status. In some embodiments, the measurement will continue to be made during the activated status of the electronic device. At block 303, the bending of the flexible display is determined based on the result of measurement.

Figure 4:
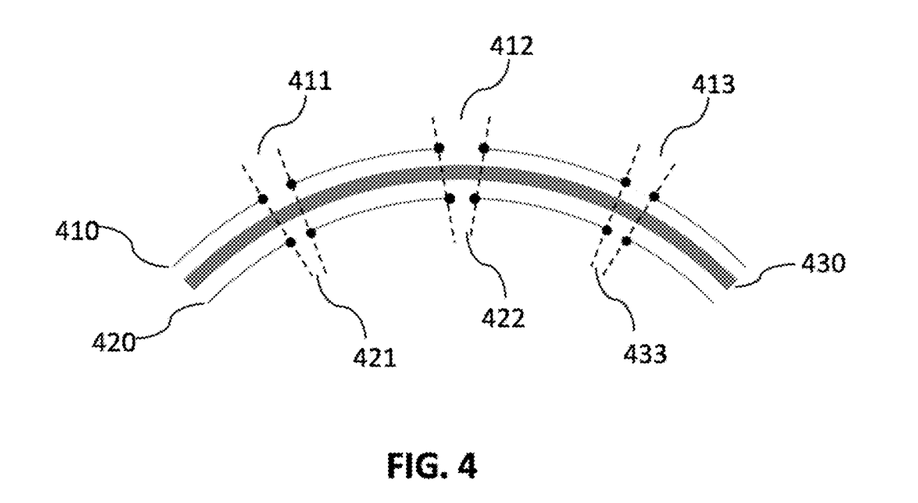
FIG. 4 shows an exemplary profile of a bending flexible display in accordance with embodiments of the present disclosure.

With reference to FIG. 4, an exemplary profile of a bending flexible display in accordance with embodiments of the present disclosure is shown. The flexible display includes a first capacitive layer 410, an isolator layer 430, and a second capacitive layer 420. Capacitive electrodes pairs 411, 412 and 413 are deployed in the first capacitive layer 410, and capacitive electrodes pairs 421, 422 and 433 are deployed in the second capacitive layer 420. It can also be known from FIG. 4 that the flexible display is bended towards the second capacitive layer 420. In some embodiments, a capacitance value of a capacitive electrodes pair in the first capacitive layer is compared with that of a corresponding capacitive electrodes pair in the second capacitive layer to determine a bending direction of the flexible display at a place where the capacitance values of the pairs of capacitive electrodes are compared. For example, capacitance value of capacitive electrodes pair 412 is compared with that of capacitive electrodes pair 422. Considering the screen thickness, distance between capacitive electrodes pair 412 is increased, and distance between capacitive electrodes pair 422 is decreased. Therefore, the layer with smaller capacitance value (or greater distance between capacitive electrodes) can be considered as an outer ring, meanwhile the layer with greater capacitance value of capacitive electrodes can be considered as an inner ring. For example, capacitance value of capacitive electrodes pair 412 will be less than that of 422. Similarly, the capacitance value of the capacitive electrodes pair 413 will be less than that of 433, and capacitance value of 411 will be less than that of 421. By making such comparison, a bending direction of the flexible display could be determined.

It would be appreciated that, with the development of flexible display, flexibility of a screen can be enhanced, hence bending of a flexible display can be presented in a very complicated manner Therefore, in accordance with embodiments of this disclosure, bending of the flexible display determined may refer to bending of the flexible display determined at a place where the capacitive electrodes are measured. In some embodiments, the bending of the flexible display determined at certain place can be representative, namely it can represent the bending of whole display. In some embodiments, this representative place can be determined given that there is no capacitance value change in other places of the flexible display, so that it could be determined that there is no bending in other places of the flexible display. In some other embodiments, this representative place can be determined given that a certain place in the flexible display has large probability to be representative according to previous analysis of this and/or other flexible display, or according to previous analysis of this and/or other software running on the flexible display. The term "place" or "places" could refer to a point, an area, a line, etc. on the flexible display.

In some embodiments, capacitance values between adjacent capacitive electrodes pairs are compared to determine a bending shape of the flexible display at a place of the adjacent capacitive electrodes pairs. Still referring to FIG. 4, a capacitance value of capacitive electrodes pair 412 is compared with that of adjacent capacitive electrodes pairs 413. According to the example shown in FIG. 4, capacitance value of 412 is less than that of 413, therefore bending at the place of 412 is sharper than that at 413, or the bending at the place of 413 is gentler than that at 412.

It could also be understood that there might be a model built to determine the bending shape of the flexible display. So long as capacitance values which indicate the bending at all measured points are input into the model, a shape of the flexible display could be concluded based on the predefined model.

In some embodiments, capacitance values of the same capacitive electrodes pair at different times are compared to determine extent of bending at a place of the capacitive electrodes pair. Provided that capacitive electrodes pair 412 in FIG. 4 is the same as capacitive electrodes pair 212 in FIG. 2, when the flexible display is bended from status in FIG. 2 to that in FIG. 4, the capacitance value of 212 is decreased. The more the capacitance value is decreased, the sharper the bending is taking place at the place of 212. Or in other words, the less the capacitance value is decreased, the gentler the bending taking place at the place of 212.

Figure 5:
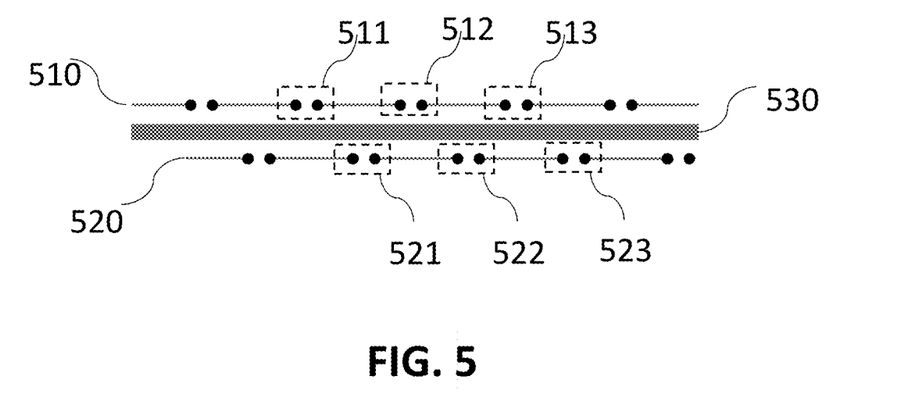
FIG. 5 shows another exemplary profile of a flat flexible display in accordance with embodiments of the present disclosure.

In accordance with embodiments of this disclosure, the capacitive electrodes in the first capacitive layer are deployed symmetrically with that in the second capacitive layer based position of the isolator layer, so that capacitive electrodes pairs in the first capacitive layer is deployed in the same position as that in the second capacitive layer. As illustrated in FIG. 2, capacitive electrodes pair 211 is corresponding to capacitive electrodes pair 221, capacitive electrodes pair 212 is corresponding to capacitive electrodes pair 222, and capacitive electrodes pair 213 is corresponding to capacitive electrodes pair 223. Therefore, capacitance value of capacitive electrodes pair 211 can be compared with that of capacitive electrodes pair 221 to determine the bending direction. However, in accordance with other embodiments, depends on the requirement for accuracy, there could be no high requirement for symmetry between the first and second capacitive layers, like what has been illustrated in FIG. 5, capacitive electrodes in the first capacitive layer are not deployed symmetrically with that in the second capacitive layer based on position of the isolator layer. It would be appreciated that capacitance value of capacitive electrodes pair 512 in the first capacitive layer 510 can be compared with that of capacitive electrodes pairs in the adjacent position in the second capacitive layer 520, namely the capacitive electrodes pairs 521 or 522.

Figure 6:
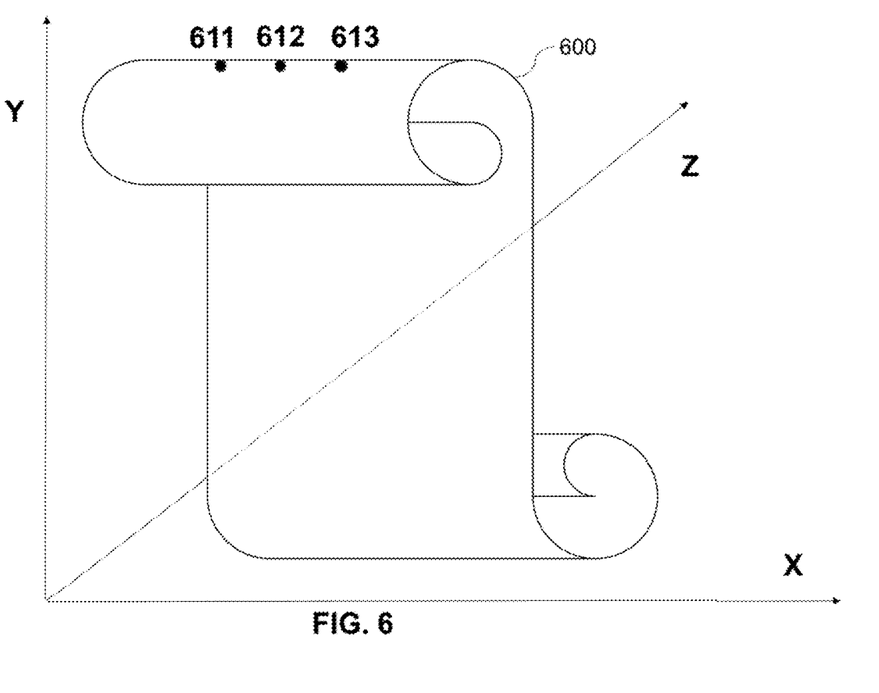
FIG. 6 shows an exemplary 3D diagram of a bending flexible display in accordance with embodiments of the present disclosure.

FIG. 6 shows an exemplary 3D diagram of a bending flexible display in accordance with embodiments of the present disclosure. Three coordinate axes labeled x, y, and z are given, each perpendicular to the other two at the origin point, the point at which they cross. The flexible display 600 is bended like a piece of paper. In operation of the flexible display, both bending and finger touch can lead to capacitance value changes, therefore it is required to distinguish finger touch from bending. According to some embodiments, an abnormal point, of which a capacitance value is changed because of a finger touch, is excluded when determining the bending of the flexible display.

In some embodiments, a point is determined as a normal point if a capacitance value of a capacitive electrodes pair in the capacitive layer at the point is the same as that of multiple other capacitive electrodes pairs which locate in the same line including the point. Referring to FIG. 6, points 611, 612, 613 are all located in the same line, and the capacitance values in those three points are the same, so it could be concluded that points 611, 612, 613 are all normal points, instead of abnormal points.

Figure 7A:
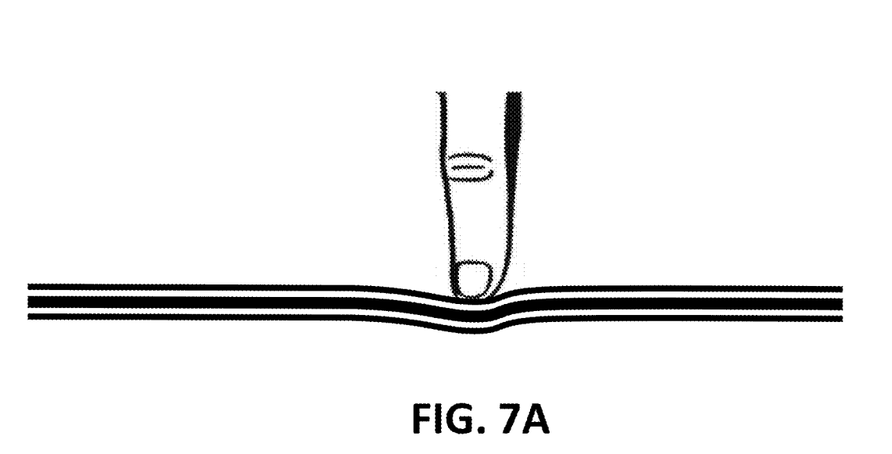
FIG. 7A shows an example profile of finger touch on a flexible display in accordance with embodiments of the present disclosure.

FIG. 7A shows an example profile of a finger touch on a flexible display in accordance with embodiments of the present disclosure. When a finger touches a screen, there could be minor deformation shaped around the touch point as shown in FIG. 7A. In some embodiments, a point is determined as an abnormal point if a capacitance value of at least one capacitive electrodes pair in the capacitive layer at the point is different than that of all surrounding points, or according to a further embodiment of this disclosure, is different than that of all surrounding points to certain extent. The term "surrounding" refers to points that are directly adjacent or in a proximity from a reference point. In an embodiment, the proximity may be preconfigured or user defined to be any value suitable for measurement of proximity.

Figure 7B:
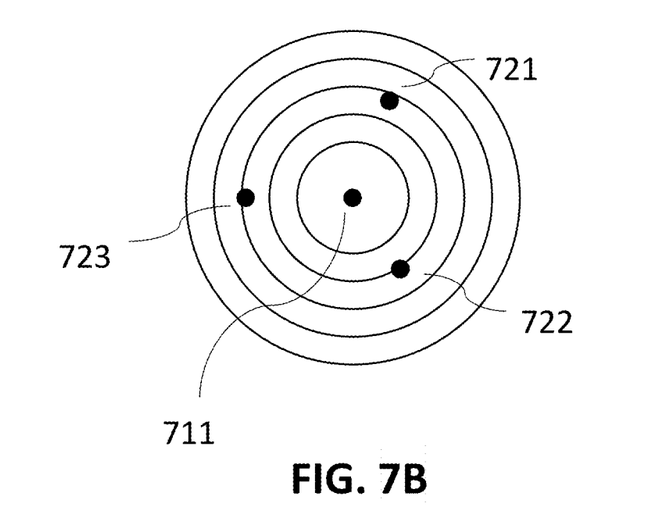
FIG. 7B shows an example contour lines of top view of the touch point at FIG. 7A.

Referring now to FIG. 7B, which shows an example contour lines of top view of the touch point at FIG. 7A. A central point 711 represents where the finger touch takes place. Given that the finger touch is on the first capacitive layer (namely, the first capacitive layer is an upper layer), the capacitance value(s) at point 711 of the first capacitive layer will be higher than that at all other surrounding points (like points 721,722,723) at the first capacitive layer. From another side, the capacitance value(s) at point 711 of the second capacitive layer will be lower than that at all other surrounding points (like points 721,722,723) at the second capacitive layer.

With the development of flexible display, softness and flexibility of the screen may be enhanced. Therefore, it might be more difficult to distinguish finger touch from bending act, such as poke. In some embodiments, a threshold could be used to determine whether the act is a finger touch or poke. For example, once gaps between capacitance values at center point and that at surrounding points is greater than a threshold, the act will be determined as a poke, otherwise, it will be determined as a finger touch.

Once the bending of the flexible display is determined, a further action on the electronic device could be triggered to perform further actions, trigger further functions, or control further objects, such as moving cursor, flipping electronic books, shooting a stone from a catapult in a game, running pages of a website, showing a pop-up context menu, etc.

Reference throughout this specification to "one embodiment," "an embodiment," "some embodiments", or similar language means that a particular feature, structure, or characteristic described in connection with the embodiment is included in at least one embodiment of the present disclosure. Thus, appearances of the phrases "in one embodiment," "in an embodiment," "in some embodiments", and similar language throughout this specification may, but do not necessarily, all refer to the same embodiment.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining bending of a flexible display screen of an electronic device, wherein the flexible display screen comprises two parallel capacitive layers and an isolator layer between the two parallel capacitive layers, wherein the two parallel capacitive layers include a first capacitive layer and a second capacitive layer, both of which comprise multiple capacitive electrodes pairs, the method comprising:
   measuring capacitance values of a capacitive electrodes pair in a first capacitive layer compared with that of a corresponding capacitive electrodes pair in a second capacitive layer, wherein the corresponding capacitive electrodes pair in the second capacitive layer and the capacitive electrodes pair in the first capacitive layer are aligned relative to a same position on the isolator layer in an unbended state of the electronic device, and measuring capacitance values of individual capacitive electrodes within the capacitive electrodes pair in the first capacitive layer and the corresponding individual capacitive electrodes within the capacitive electrodes pair in the second capacitive layer; and
   determining the bending of the flexible display screen based on the:
      measured capacitance values of the capacitive electrodes pair in the first capacitive layer compared with that of the corresponding capacitive electrodes pair in the second capacitive layer; and
      measured capacitance values of the individual capacitive electrodes within the capacitive electrodes pair in the first capacitive layer compared with that of the corresponding individual capacitive electrodes within the capacitive electrodes pair in the second capacitive layer.

2. The method of claim 1, wherein determining the bending of the flexible display screen comprises:
   determining a bending direction of the flexible display screen by comparing a capacitance value of a capacitive electrodes pair in the first capacitive layer with that of a corresponding capacitive electrodes pair in the second capacitive layer.

3. The method of claim 1, wherein determining the bending of the flexible display screen comprises:
   determining a bending shape of the flexible display screen by comparing capacitance values between adjacent capacitive electrodes pairs.

4. The method of claim 1, wherein determining the bending of the flexible display screen comprises:
   determining extent of bending by comparing capacitance values of the same capacitive electrodes pair at different times.

5. The method of claim 1, wherein determining the bending of the flexible display screen comprises:
   excluding an abnormal point where a capacitance value of a capacitive electrodes pair is changed because of a finger touch.

6. The method of claim 5, wherein excluding an abnormal point comprises:
   determining a point as an abnormal point if a capacitance value of a capacitive electrodes pair corresponding to the point is different than that of all surrounding points.

7. The method of claim 5, wherein excluding an abnormal point comprises:

determining a point as a normal point if a capacitance value of a capacitive electrodes pair corresponding to the point is the same as capacitance values of multiple other capacitive electrodes pairs located in the same line passing through the point.

8. The method of claim 1, comprising:
performing a further action on the electronic device based on the determination of bending.

9. An electronic device, comprising a flexible display screen, wherein the flexible display screen comprises:
two parallel capacitive layers, including a first capacitive layer and a second capacitive layer, both of which comprise multiple capacitive electrodes pairs, and an isolator layer between the two parallel capacitive layers, and wherein capacitance values of a capacitive electrodes pair in a first capacitive layer are compared with that of a corresponding capacitive electrodes pair in a second capacitive layer, wherein the corresponding capacitive electrodes pair in the second capacitive layer and the capacitive electrodes pair in the first capacitive layer are aligned relative to a same position on the isolator layer in an unbended state of the electronic device, and wherein capacitance values of individual capacitive electrodes within the capacitive electrodes pair in the first capacitive layer are compared with that of the corresponding individual capacitive electrodes within the capacitive electrodes pair in the second capacitive layer, wherein bending of the flexible display screen is determined based on the:
compared capacitance values of the capacitive electrodes pair in the first capacitive layer with that of the corresponding capacitive electrodes pair in the second capacitive layer; and
compared capacitance values of the individual capacitive electrodes within the capacitive electrodes pair in the first capacitive layer with that of the corresponding individual capacitive electrodes within the capacitive electrodes pair in the second capacitive layer.

10. The electronic device of claim 9, wherein determine the bending of the flexible display screen comprises:
determining a bending direction of the flexible display screen by comparing a capacitance value of a capacitive electrodes pair in the first capacitive layer with a capacitance value of a corresponding capacitive electrodes pair in the second capacitive layer.

11. The electronic device of claim 9, wherein determining the bending of the flexible display screen comprises:
determining a bending shape of the flexible display screen by comparing capacitance values between adjacent capacitive electrodes pairs.

12. The electronic device of claim 9, wherein determine the bending of the flexible display screen comprises:
determining extent of bending by comparing capacitance values of the same capacitive electrodes pair at different times.

13. The electronic device of claim 9, wherein determine the bending of the flexible display screen comprises:
excluding an abnormal point where a capacitance value of a capacitive electrodes pair is changed because of a finger touch.

14. The electronic device of claim 13, wherein excluding an abnormal point comprises:

determining a point as an abnormal point if a capacitance value of a capacitive electrodes pair corresponding to the point is different than capacitance values of all surrounding points.

15. The electronic device of claim 13, wherein excluding an abnormal point comprises:
determining a point as a normal point if a capacitance value of a capacitive electrodes pair corresponding to the point is the same as capacitance values of multiple other capacitive electrodes pairs located in the same line passing through the point.

16. A computer program product for determining bending of a flexible display screen of an electronic device, wherein the flexible display screen comprises two parallel capacitive layers and an isolator layer between the two parallel capacitive layers, wherein the two parallel capacitive layers include a first capacitive layer and a second capacitive layer, both of which comprise multiple capacitive electrodes pairs, the computer program product comprising a computer readable storage medium having program instructions embodied therewith, the program instructions being executable by a computer to cause the computer to:
measure capacitance values of a capacitive electrodes pair in a first capacitive layer compared with that of a corresponding capacitive electrodes pair in a second capacitive layer, wherein the corresponding capacitive electrodes pair in the second capacitive layer and the capacitive electrodes pair in the first capacitive layer are aligned relative to a same position on the isolator layer in an unbended state of the electronic device, and measuring capacitance values of individual capacitive electrodes within the capacitive electrodes pair in the first capacitive layer and the corresponding individual capacitive electrodes within the capacitive electrodes pair in the second capacitive layer; and
determine the bending of the flexible display screen based on the:
measured capacitance values of the capacitive electrodes pair in the first capacitive layer compared with that of the corresponding capacitive electrodes pair in the second capacitive layer; and
measured capacitance values of the individual capacitive electrodes within the capacitive electrodes pair in the first capacitive layer compared with that of the corresponding individual capacitive electrodes within the capacitive electrodes pair in the second capacitive layer.

17. The computer program product of claim 16, wherein the program instructions causing the computer to determine the bending of the flexible display screen further comprise instructions to:
determine a bending direction of the flexible display screen by comparing a capacitance value of a capacitive electrodes pair in the first capacitive layer with a capacitance value of a corresponding capacitive electrodes pair in the second capacitive layer.

18. The computer program product of claim 16, wherein determining the bending of the flexible display screen comprises:
determining extent of bending by comparing capacitance values of the same capacitive electrodes pair in different times.

* * * * *